United States Patent Office 3,697,226
Patented Oct. 10, 1972

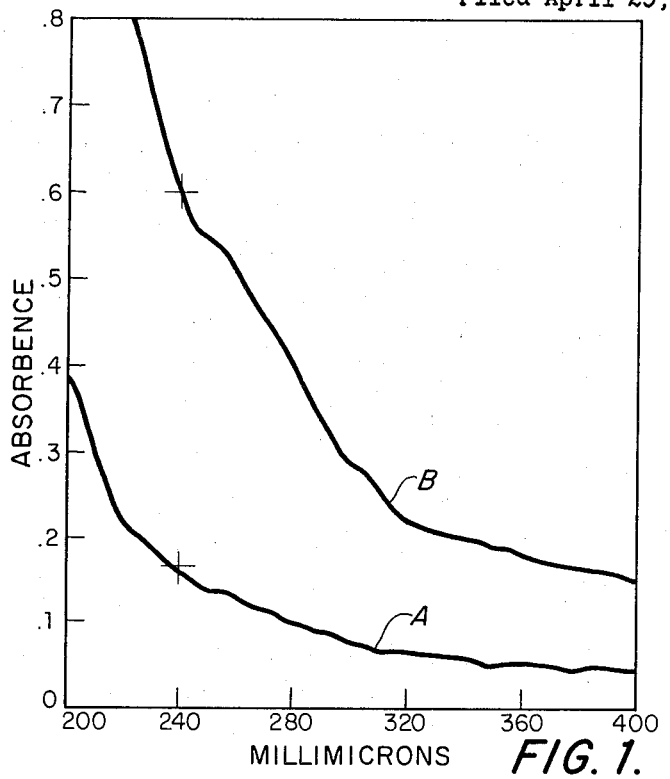
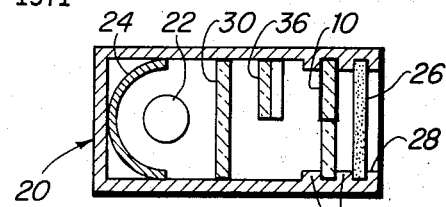
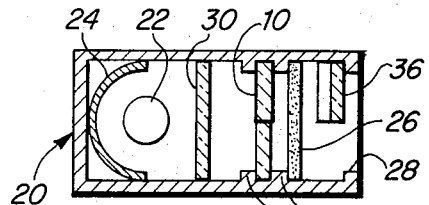
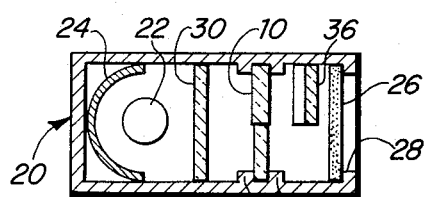
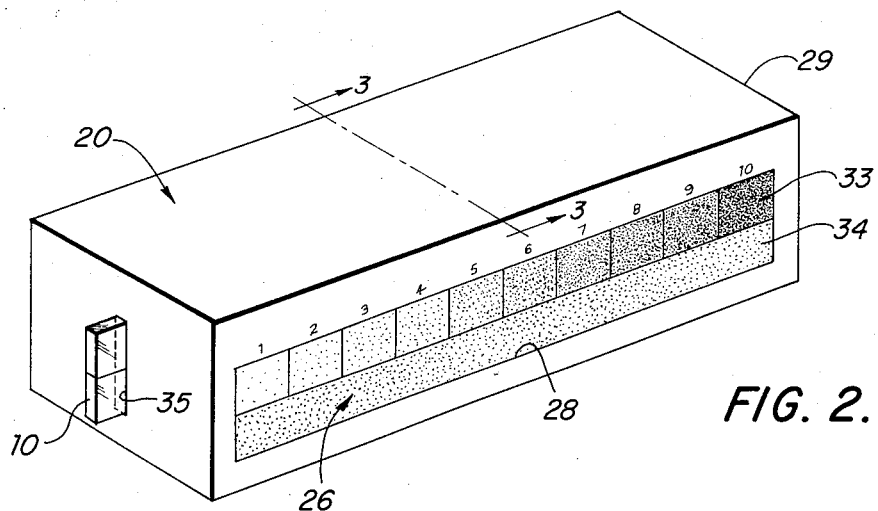
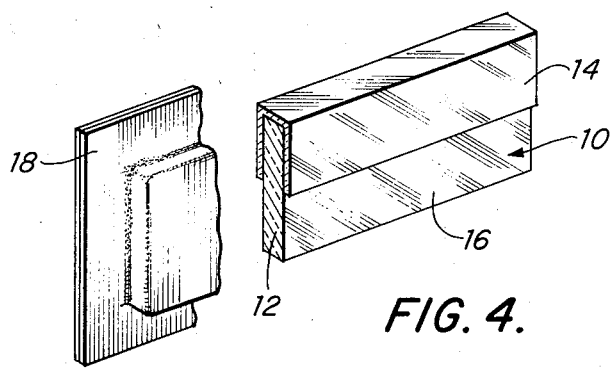
TOMAS HIRSCHFELD
NOBORU MATSU
INVENTORS.
BY
Schiller & Pandiscio
ATTORNEYS.

3,697,226
HYDROCARBON DETECTOR SYSTEM
Tomas Hirschfeld, Framingham, and Noboru Matsu, Marblehead, Mass., assignors to Block Engineering, Inc., Cambridge, Mass.
Filed Apr. 29, 1971, Ser. No. 138,486
Int. Cl. G01m 21/38, 33/22
U.S. Cl. 23—254 R                                                        12 Claims

ABSTRACT OF THE DISCLOSURE

A system for detecting and quantitatively measuring the presence of unsaturated and aromatic hydrocarbons, particularly vapors of partially burned and residual unburned hydrocarbons in the exhaust emissions of gasoline internal combustion engines. The system includes a partially shielded membrane adapted to react with aromatic and unsaturated hydrocarbons to produce derivatives having strong absorption characteristics in the ultraviolet region. There is also provided an ultraviolet fluorescence photometer including an ultraviolet source and a visible fluorescent screen between which the exposed membrane is introduced. The photometer includes a gray scale or step wedge for visually comparing the ultraviolet absorption in the unshielded section of the membrane against a calibrated standard including the shielded section of the membrane and the gray scale.

---

The present invention is concerned with the detection and measurement of certain hydrocarbon vapors and particularly, for detecting and quantitatively measuring hydrocarbons found in the exhaust emissions of internal combustion engines.

In applicant's commonly assigned patent application U.S. Ser. No. 198,982, there is described a novel and improved method of detecting the vapors of aromatic and unsaturated hydrocarbons by reacting the hydrocarbon vapors with a membrane of polytetrafluorethylene sulfonic acid and examining the ultraviolet transmission characteristics of the reacted membrane. The derivatives of this reaction have strong absorption characteristics in the ultraviolet radiation band enabling the detection of the aforementioned hydrocarbon compounds. The particular hydrocarbon vapors detected by this method, whether in the form of a gas or an aerosol, include many of the pyrolytic products of partially burned and residual unburned gasoline. The quantity of the hydrocarbon vapors in the exhaust emission of internal combustion engine provides a measurement of the efficiency of combustion of the engine, the amount of hydrocarbon pollutants being emitted by the engine and the effectiveness of pollution emission control devices which may be associated with the engine.

A principal object of the present invention is to provide a simple ultraviolet photometer system for detecting vapors of both unsaturated and aromatic hydrocarbons. Another object of the present invention is to provide a simple and inexpensive system capable of use by an untrained person for rapidly, easily and accurately quantitatively measuring the pollutants emitted by internal combustion engines such as in automobiles.

This and other objects of the invention are realized by the provision of a system including a simple ultraviolet photometric device and a reactive membrane adapted to be exposed to reactive vapors, for example to the exhaust system of an engine, and inserted in the photometric device to give an immediate, quantitative measurement of the aromatic and unsaturated hydrocarbon in the vapors.

Other objects of the invention will in part be obvious and will in part appear hereinafter.

The invention accordingly comprises the apparatus possessing the construction, combination of elements and arrangements of parts which are exemplified in the following detailed disclosure, and the scope of the application of which will be indicated in the claims.

For a fuller understanding of the nature and objects of the invention, reference should be had to the following detailed description taken in connection with the accompanying drawings wherein:

FIG. 1 is a diagram illustrating ultraviolet absorption characteristics of a typical membrane embodied in the system of the invention illustrating the operation thereof;

FIG. 2 is a perspective view of the vapor measuring system of the invention;

FIG. 3 is a sectional view taken substantially along the line 3—3 of FIG. 2;

FIG. 4 is a fragmentary, perspective view of a component of the system of the invention;

FIG. 5 is a sectional view, similar to FIG. 3, taken through an alternative embodiment of the device of the invention; and FIG. 6 is a sectional view through yet another embodiment of the device of the present invention.

The vapor detecting and measuring system of the invention comprises two basic components, namely a partially shielded membrane adapted to be exposed to the exhaust stream of an engine and an ultraviolet photometric device into which the exposed membrane is introduced for quantitatively measuring the hydrocarbon pollutants. As described in applicant's aforementioned copending application, the membrane material is a completely fluorinated, alkene-based polymer film containing pendant sulfonyl groups. Typically such a film is a polytetrafluorethylene sulfonic acid membrane sold by E. I. du Pont de Nemours and Company and designated "XR Perfluorsulfonic Acid Membranes." It has been found that such membranes typically exhibit an ultraviolet absorption represented by curve "A" in FIG. 1. It will be noted that for a wavelength of about 240 millimicrons, the absorption coefficient is of the order of 0.17. Curve B represents the ultraviolet absorption of the same membrane after being exposed for a few minutes, e.g. five, to the vapors of hydrocarbons which contain at least one multiple carbon-to-carbon band, such as are typically found in the exhaust emission of an idling, gasoline internal combustion engine. It will be noted that the absorption coefficient in the 240 millimicron region has increased to 0.6, i.e. by a factor of about 3.5. This increase in absorption in the 240 millimicron region is believed to be due to the formation of derivatives of the reaction between the sulfonyl groups of the membrane material and hydrocarbons including aromatics such as benzene, xylene, anthracene, naphthalene and carbazole and unsaturates such as alkene, conjugated dienes and alkylenes.

The absorption coefficient of the exposed membrane is a direct function of the amount of ultraviolet absorbing derivatives formed in the membrane and this, in turn, is proportional to the quantity of reactive vapors present in the atmosphere around the exposed film and to the exposure time. The present invention provides a simple system for measuring the ultraviolet absorption of an exposed membrane against a standard to give an immediate and easily obtainable measure of that proportion of vapors.

The membrane which comprises one of the basic components of the system of the invention is illustrated in FIG. 4 as comprising a rectangular strip or film 10 of a perfluoralkene sulfonyl material such as described. A rectangular section 12, extending from end to end of strip 10, is coated with a protective layer or film 14 of a material adapted to prevent the membrane from being exposed to and reacting with ambient hydrocarbon vapors. The initially shielded section 12 is intended to provide a control or standard for later comparison with the remaining unshielded section 16 of strip 10 which is exposed to and free to react with ambient hydrocarbon vapors. Suitable materials for this purpose include metallic foils such as aluminum and the like.

Strip 10 may be handled manually without any significant reaction occuring since only a relatively few sulfonyl groups near the surface will be affected. This makes it possible for a person to "expose" the strip by merely holding it, for example, in the stream of exhaust gases emerging from an engine.

Strip 10 is preferably provided to the user initially in a sealed envelope 18 designed to protect it from exposure to the ambient atmosphere prior to use. Envelope 18 can be made of any of a number of well known vapor impervious types of materials widely used in the packaging art, for example, metal foil which may be bonded to itself to seal the envelope. It is intended that the envelope be opened and the strip 10 removed immediately prior to exposure to the reactive vapors in order to minimize prior exposure to the ambient atmosphere. Following exposure, the shielding around section 12 is stripped off and strip 10, then with both exposed and unexposed sections, is placed into the photometer.

The other basic component of the vapor measuring system of the present invention is a photometric device, shown in FIGS. 2 and 3, for measuring the ultraviolet absorption in section 16 of strip 10 following exposure of the latter to reactive vapors. This device, designated 20, comprises a housing enclosing ultraviolet light source 22 and reflector 24 for directing radiation from source 22 onto exciting fluorescent screen 26. The latter is visible through opening 28 in external housing 29 of device 20 and includes a phosphor adapted to emit visible light when excited by ultraviolet radiation. Source 22 may comprise a conventional quartz-mercury lamp having a high emission peak at about 254 millimicrons. A bandpass or line filter 30 may be provided between the lamp and screen for limiting radiation to any desired region such as around 240 millimicrons. Device 10 may also include a diffuser located adjacent or incorporated as a part of filter 30 for providing uniform illumination of screen 26.

Means in the form of guides 32 are provided for supporting strip 10 in a position between ultraviolet light source 22 and screen 26 so that a first portion 33 of screen 26 will be illuminated by light passing through section 12 and a second portion 34 of the screen will be illuminated by light passing through section 16. This permits the subtracting of background absorption, thereby providing a basis from which to measure the ultraviolet absorption of exposed section 16 with greater accuracy. Slot 35 is provided in a side wall of housing 29 to permit introduction of the exposed strip 10 into position between guides 32 for interposition between source 22 and screen 26.

In the arrangement shown, the intensity of the light emitted by portion 33 of screen 26 excited by light passing through section 12 will be a function of the ultraviolet absorption for a particular, unexposed membrane, while the intensity of the light emitted by portion 34 of the screen will be equal or less. Any difference is a function or measure of the hydrocarbon vapors to which the strip 10 was exposed and reacted. In order to provide a quantitative measure of this difference, a conventional gray scale such as neutral density step wedge 36 is mounted in the path of light to or from only portion 33 of screen 26 which is illuminated by ultraviolet radiation passing through unexposed section 12 of strip 10. As shown in FIG. 3, the step wedge may be located between the ultraviolet source and the screen, and film 10 is intended to lie between wedge 36 and screen 26. Alternatively as shown in FIG. 5, (which shows all the elements of FIG. 3 but differently arranged) the step wedge is disposed adjacent exterior of the screen in the path of visible light from the screen. In the embodiment of FIG. 6, it will be seen that the device is constructed to that strip 10 when inserted is disposed between source 22 and wedge 36. In the position shown in FIG. 3, step wedge 36 preferably is formed of etched quartz or of an ultraviolet absorbing material of varying thickness or density. When located externally of the screen, the step wedge may be used or preferably one employs a neutral density filter or a gray scale. In the example shown in FIG. 2, wedge 36 provides ten steps designated by numerical indicia inscribed on the housing above opening 28, the indicia ranging from zero density (e.g. number 1) to a maximum density (e.g. number 10). Thus, all that is required of the operator is to visually determine which numbered portion of the screen appears to have a brightness closest to or identical with the brightness of the portion (lower, viewing FIG. 2) of the screen illuminated by ultraviolet radiation transmitted by exposed section 16 of strip 10. Such visual comparison can be made quite accurately and no extensive training or experience is required.

Although the drawings show substantial spacing between the various components including the filter and/or diffuser 30, step wedge 36, strip 10 and screen 26, in the actual, preferred form of the device, these components will be located in close proximity so as to maintain a clear dividing line between the differently excited portions of the screen.

It is also contemplated that the ultraviolet absorption characteristics of the membrane material may be standardized or maintained within tolerance limits that will make the provision of a shielded (standard) membrane section unnecessary. In this event, device 20 would be constructed to support a narrow strip of the membrane material in the path of ultraviolet radiation in the position occupied by section 16 in the device shown, and exciting the portion (lower) of the screen which produces illumination not modified by the step wedge. Such a device might also incorporate an ultraviolet filter duplicating the ultraviolet absorption of the unexposed and unreacted membrane material located in the path of ultraviolet radiation incident on the portion (upper) of the screen which produces illumination modified by the step wedge. Such a filter might be associated with or made a part of a step wedge located between the source and phosphor screen.

It will be seen that objects of the invention are realized in an inexpensive and easy to use system by which an automobile mechanic, for example, may rapidly and accurately evaluate the operation of a gasoline internal combustion engine and determine if pollution emissions are within permissible limits. This is accomplished by detecting and quantitatively measuring certain hydrocarbons in the exhaust emissions of the engine utilizing a change in the ultraviolet transmission characteristics of a test strip held briefly in the engine exhaust stream. The operator (mechanic) requires no training or experience in order to make accurate measurements since the process requires only that the test strip be held in the exhaust stream and then be inserted in an ultraviolet photometric device and a simple visual comparison be made.

Since certain changes may be made in the above apparatus without departing from the scope of the invention herein involved it is intended that all matter contained in the above description or shown in the accompanying drawings shall be interpreted as illustrative and not in a limiting sense.

What is claimed is:

1. A system for detecting and quantitatively measuring vapor of aromatic and unsaturated hydrocarbons comprising in combination:

a perfluoroalkene sulfonyl polymer sheet including at least a first section adapted to be exposed to said vapor;

a source of ultraviolet radiation;

a fluorescent screen activated by ultraviolet radiation from said source to emit visible light;

means for positioning said sheet between said screen and said source to excite at least a first portion of said screen by radiation from said source transmitted by said first section of said sheet.

2. A hydrocarbon detection and measuring system as defined in claim 1 wherein said radiation source provides radiation to said screen predominantly in the vicinity of 240 millimicrons.

3. A hydrocarbon detection and measuring system as defined in claim 2 wherein said radiation source includes an ultraviolet passband filter.

4. A hydrocarbon detection and measuring system as defined in claim 1 including a radiation transmitting, neutral density means for providing a standard for measuring the absorption of said radiation transmitted by said first section of said membrane, said neutral density means being positioned in the path of radiation to or from a second portion of said screen contiguous with said first portion of said screen.

5. A hydrocarbon detection and measuring system as defined in claim 4 wherein said sheet includes at least a second section contiguous with said first section, said second section having a removable layer for protecting the latter from exposure to ambient vapors, and wherein said holding means is adapted to position said sheet so that said second portion of said screen can be excited by radiation from said source transmitted by said second section of said sheet following removal of said layer.

6. A hydrocarbon detection and measuring system as defined in claim 5 wherein said neutral density means is positioned between said source and said second portion of said screen in the path of radiation transmitted from said source by said second section of said sheet following removal of said layer.

7. A hydrocarbon detection and measuring system as defined in claim 5 wherein said neutral density means is positioned outside of said screen so as to be in the path of radiation emanating from said screen and arising from radiation transmitted from said source by said second section of said sheet to said screen following removal of said layer.

8. A hydrocarbon detection and measuring system as defined in claim 5 wherein said holding means is adapted to position said sheet so that said second section of said sheet is disposed between said screen and said neutral denity means in the path of radiation transmitted by the latter from said source.

9. A hydrocarbon detection and measuring system as defined in claim 5 wherein said protective layer is formed of a substantially vapor impervious material for preventing exposure of said second section to said vapor.

10. For use in a system for detecting and quantitatively measuring the vapors of aromatic and unsaturated hydrocarbons, a sheet of a perfluoralkene sulfonyl polymer, said sheet including a first section thereof coated with a protective stratum of a material substantially impervious to said vapors for shielding said first section from exposure to said vapors, and a second section exposed for contacting said vapors.

11. A hydrocarbon detection and measuring system as defined in claim 10 wherein said membrane is formed of polytetrafluorethylene sulfonic acid.

12. A hydrocarbon detection and measuring system as defined in claim 10 wherein said protective stratum is formed of a metallic foil.

References Cited

UNITED STATES PATENTS

| | | | |
|---|---|---|---|
| 3,282,875 | 11/1966 | Connolly et al. | 260—29.6 F |
| 3,560,159 | 2/1971 | Goetz | 23—232 R |
| 3,102,192 | 8/1963 | Skala | 23—232 R |
| 2,490,345 | 12/1949 | Flatford et al. | 23—232 R |

MORRIS O. WOLK, Primary Examiner

E. A. KATZ, Assistant Examiner

U.S. Cl. X.R.

23—230 HC, 232 R; 250—71 R